United States Patent Office 3,526,140
Patented Sept. 1, 1970

3,526,140
METHOD AND APPARATUS OF SIMULATING ZERO GRAVITY CONDITIONS
Helmut G. Lackner, Huntsville, Ala., assignor to the United States of America as represented by the Administrator of the National Aeronautics and Space Administration
Filed Mar. 11, 1969, Ser. No. 806,149
Int. Cl. G01l 1/00
U.S. Cl. 73—432  6 Claims

ABSTRACT OF THE DISCLOSURE

A method and apparatus for determining the effects of acoustic radiation pressure on a liquid suspended in a substantially frictionless environment. The apparatus includes an ultrasonic transducer excited by the output of a power amplifier. The power amplifier amplifies the output of an oscillator which has been adjusted to deliver an output at a frequency of approximately 100 kHz. The transducer is oriented so that the acoustic energy or pressure generated thereby is directed in a beam toward droplets of a cryogenic liquid floating on a precisely leveled plate. The droplet floats on a vapor envelope that surrounds and thermally insulates the droplet. Such a droplet can sustain for some time up to a minute. This apparatus and method makes it possible to investigate the transfer behavior of cryogenic liquids under zero gravity.

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

The development of the capability to orbit various types of space vehicles has been accompanied by a need to investigate the transfer behavior of cryogenic liquids such as rocket propellants within a fuel tank. These propellants under zero-gravity can move freely about within the tank and may become dispersed at random in irregular globules throughout the tank. It is necessary in space vehicles that the liquid propellants in the tanks cover the inlets to propellant pumps and suction lines so that during restarting at least the inlets will always be in communication with a supply of propellant. Otherwise the flow of propellant to the rocket engine could be erratic and result in faulty engine operation. Thus, it is desirable to provide some means for assuring proper positioning of the propellant within a propellant tank.

A source of ultrasonic force or pressure has been suggested as a means of positioning the propellant within a tank. Ultrasonic forces have disruptive effects on machinery and structures and therefore it is desirable to use only the force intensity that is required. Also, a device capable of delivering great force has increased heat dispersion, and increased electrical power requirement which means larger batteries, fuel cells or other power source; all of which increase the weight of an orbiting vehicle. Thus, it is desirable to limit the size and complexity of an ultrasonic source of energy to that level sufficient to accomplish a desired purpose, i.e., position propellants within a tank. The determination of what output is required is complicated however by the fact that the only way to subject a tank of cryogenic propellants to zero-gravity is to place such tank in orbit. This is very expensive and it is much more desirable to develop a method and technique for obtaining such information in a laboratory on earth.

SUMMARY OF THE INVENTION

The present invention provides a method and apparatus for determining in a laboratory the ultrasonic forces necessary to move masses of cryogenic liquids in the fuel tanks of orbiting space vehicles. This is accomplished by directing acoustic energy or radiation pressure of a known ultrasonic frequency toward a droplet of liquid nitrogen or other cryogenic liquid floating free of friction on a leveled plate. This frictionless support of the droplet, which makes it possible to simulate movement of a mass in zero-gravity, is explained by Leidenfrost's phenomenon. Leidenfrost's phenomenon is the fact that a liquid droplet placed on a surface with a temperature higher than the boiling temperature of the liquid, builds up an envelop of vapor around the droplet which is a bad heat conductor and thus thermally insulates the droplet. Such a droplet can sustain for some time up to a minute. The vapor envelop in addition to thermally insulating the droplet also provides an ideal gas bearing between the droplet and the surface of the level plate, thus providing a friction free support for the droplet. The source of acoustic energy or radiation pressure is a transducer excited by the amplified output of an oscillator operating at about 100 kHz. By appropriate calculations it is possible to extrapolate from experimental data obtained just what radiation pressure and power is necessary to move a particular propellant mass in zero-gravity.

DETAILED DESCRIPTION OF THE INVENTION

Figure 1:
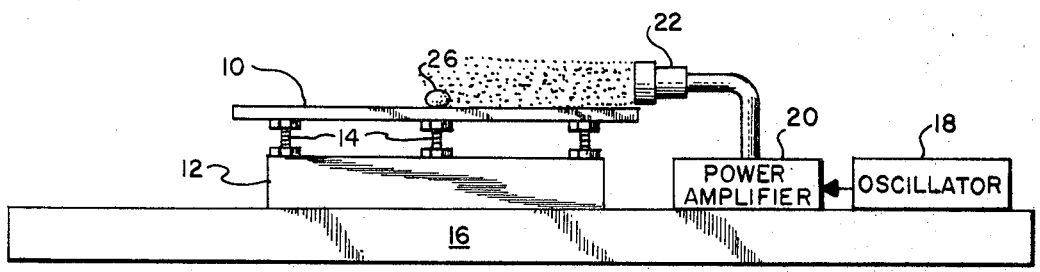
FIG. 1 is a schematic illustration of an apparatus for simulating zero-gravity conditions.

Referring to the drawing wherein an apparatus for simulating zero-gravity in a horizontal plane is shown. The apparatus includes a plate 10 having a polished upper surface supported over a base 12 by means of suitable level adjustment mechanisms 14. Mechanisms 14 permit leveling of plate 10 to provide a precisely level horizontal plane. The plate and base, as well as other components of the invention, are positioned on a table or platform 16.

An oscillator 18 is connected to a power amplifier 20 and the amplified oscillator output is connected to an ultrasonic quartz transducer 22. Transducer 22 is supported on a mast and oriented so that acoustic energy radiated therefrom when the transducer is excited by the amplifier output is directed toward a droplet 26 of a cryogenic liquid that has been placed on the plate by any suitable dispensing device (not shown).

Zero-gravity in three dimensional space means that there is no gravitational acceleration in any direction and therefore there are no gravitational forces. To simulate this condition in the laboratory a two dimensional horizontal cross section or plane is needed where under prevailing gravity the horizontal forces are zero. This can be accomplished by carefully leveling plate 10 so that there is no tendency for a droplet of liquid placed on the plate to move about on the plate. In other words there are no gravitational forces acting in the horizontal plane of possible motion. Gravitational forces would be present if the plate were not level.

Figure 2:
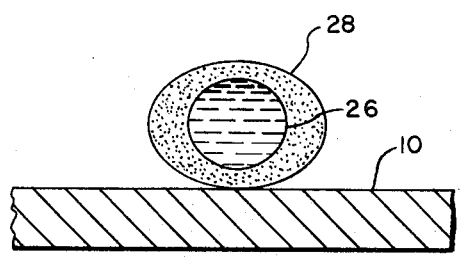
FIG. 2 is an enlarged view of a cryogenic liquid droplet surrounded by a vapor envelop.

It is also necessary to consider the fact that an object under zero-gravity can move freely through a space without any friction forces between it and a supporting surface. A frictionless engagement between droplet 26 and plate 10 can be obtained by making use of Leidenfrost's phenomenon. Leidenfrost's phenomenon is that a liquid droplet placed on a surface with a temperature higher than the boiling temperature of the liquid, builds up an envelope of vapor which is a bad heat conductor and thus thermally insulates the liquid droplet. Such a droplet can sustain for some time up to a minute supported on the plate. FIG. 2 illustrates the vapor envelop 28 that forms when a droplet of liquid nitrogen or other cryogenic liquid is placed on a plate that is at room temperature. The layer of vapor between the liquid and the plate forms an ideal gas bearing that enables the droplet to be moved about free of friction.

Experiments utilizing the apparatus have proven that droplets of liquid nitrogen resting stationary on a level plate can be accelerated by the external forces produced by acoustical radiation pressure generated by an ultrasonic transducer. It was found that the wavelength of the acoustical energy produced by the transducer had to be on the order of or smaller than the geometrical dimensions of the droplet being moved over the plate. Movement of the droplet was obtained by acoustic energy in the frequency range between 60 kHz. and 100 kHz. However, best results were obtained with ultrasonic frequencies of about 100 kHz. At lower frequencies, those below 60 kHz., the radiation pressure acts on all sides of the droplet and there is no movement of the droplet. At these lower frequencies the wavelength of the acoustic radiation is larger than the diameter of the droplet and therefore propagates to all surfaces of the droplet. This can be further explained by making an analogy to the reception of electromagnetic medium frequency radiation and microwave radiation. Medium frequency radiation can be received behind an obstacle because it bends around all objects due to the fact that most objects are smaller than these long RF wavelengths, while microwave radiation cannot be received behind an obstacle which is large compared to the wavelength.

At frequencies above 100 kHz. the directional diagram of the transducer; i.e. the beam of acoustic energy generated by the transducer, becomes so narrow that it is not efficient. Such a beam has a needle-like shape and it is difficult to orient the transducer so that the beam hits the droplet to be moved. In contrast to this the beam has a wider lobe or span at 100 kHz. and the beam can readily be directed so that it impinges on a droplet. The exact operating frequency in this range is determined by the resonance frequency of the transducer which delivers maximum power.

How the present invention is practiced is readily apparent. A droplet of a cryogenic liquid is placed upon the plate and the oscillator and amplifier activated so that the transducer is excited and acoustic energy is directed to the droplet on which acoustic radiation pressure builds up. Since the droplet is suspended on a level plate in a frictionless manner the only parameters which determine how much acceleration is imparted on the droplet are: the intensity of the acoustic radiation pressure, the effective cross-sectional area of the droplet, and the mass of the droplet. By making observations and measurements using the present invention it is possible to accumulate data from which calculations can be made to determine the size and type of acoustic energy source required for positioning propellants in a tank in zero-gravity. It is contemplated that transfer or movement of a propellant within a tank would require more than a single transducer since a single transducer has a rather narrow lobe which would not be very efficient in moving liquid within the tank. It is believed that high speed scanning of the liquid to be positioned, with ultrasonic energy, would create a local pressure that changes its position so rapidly that a quasi-continuous unidirectional pressure would be applied onto the floating liquid within the tank. Rather than moving the transducer mechanically this beam scanning could be accomplished with an array of ultrasonic transducers arranged in the form of a matrix where each transducer is fed with power that is phase shifted with respect to the power fed to an adjacent transducer. This technique would provide scanning in X and Y directions similar to the scanning pattern used in a television screen. This technique is well known and used in electronically scanned antennas known as phased arrays. Such antennas consist of mechanically fixed radiation apertures of which the phase of excitation is varied so as to change the direction of radiation.

What is claimed is:
1. A method for determining the effect of acoustic radiation pressure on a mass of cryogenic liquid propellants in zero-gravity comprising the steps of:
   placing a droplet of a cryogenic liquid on a precisely leveled plate at room temperature so as to form a vapor envelop around said droplet that floats said droplet in a substantially friction free manner over the plate; and
   directing acoustic energy from an ultrasonic transducer at said droplet so as to exert acoustic radiation pressure thereon that moves said droplet in a horizontal direction and provides data for determining the amount of acoustic energy needed to position cryogenic fuels within the fuel tank of a space vehicle.
2. The method recited in claim 1 wherein the acoustic energy directed at the droplet has a frequency in the range of 60 kHz. to 100 kHz.
3. The method recited in claim 1 wherein the acoustic energy directed at the droplet has a frequency of about 100 kHz.
4. An apparatus for determining the effect of acoustic radiation pressure on a mass of cryogenic liquid in a zero-gravity environment comprising:
   a precisely leveled plate means adapted to have a droplet of cryogenic liquid placed thereon whereby said droplet will float friction freely on said plate on a layer of vapor; and
   a source of ultrasonic energy positioned adjacent said leveled plate means and oriented so that acoustic radiation from said source can be directed at said droplet of cryogenic liquid to accelerate and move said droplet across said plate means.
5. The apparatus recited in claim 4 wherein said source of ultrasonic energy includes:
   an ultrasonic quartz transducer;
   an oscillator adapted to operate in the frequency range of 60 to 100 kHz.; and
   a power amplifier connected to said oscillator and said transducer for amplifying the output of said oscillator and feeding it to said transducer, whereby said transducer is excited and an ultrasonic radiation pressure is applied to said droplet.
6. The apparatus recited in claim 5 wherein said plate means has a polished upper surface.

References Cited
UNITED STATES PATENTS

| | | | |
|---|---|---|---|
| 3,264,467 | 8/1966 | Mann et al. | 73—432 XR |
| 3,273,388 | 9/1966 | Webb | 73—432 XR |
| 3,330,159 | 7/1967 | Ongaro | 73—432 |
| 3,339,418 | 9/1967 | Paynter et al. | 73—432 |

S. CLEMENT SWISHER, Primary Examiner

H. C. POST III, Assistant Examiner

U.S. Cl. X.R.

181—.5